United States Patent

Froumajou

[15] 3,642,296
[45] Feb. 15, 1972

[54] ARRANGEMENT OF A FUEL TANK AND A SPARE WHEEL ON AN AUTOMOBILE VEHICLES

[72] Inventor: Armand Froumajou, Pontoise, France

[73] Assignees: Automobiles Peugeot, Paris; Regie Nationale des Usines Renault, Billancourt, France

[22] Filed: Oct. 26, 1970

[21] Appl. No.: 83,977

[30] Foreign Application Priority Data

Nov. 24, 1969 France....................................6940339

[52] U.S. Cl. ...........................280/5 A, 224/42.04, 296/37.2
[51] Int. Cl. .............................................................B60p 3/22
[58] Field of Search....................280/5; 224/42.04; 296/37.2

[56] References Cited

UNITED STATES PATENTS

| | | | |
|---|---|---|---|
| 2,358,481 | 9/1944 | Slack | 224/42.04 |
| 2,631,886 | 3/1953 | Keller | 296/37.2 |

OTHER PUBLICATIONS

Automobile industries – Vol. 102 Issue No. 4, Page 33, Feb. 15, 1950

*Primary Examiner*—Leo Friaglia
*Attorney*—Burns, Doane, Swecker & Mathis

[57] ABSTRACT

A vehicle in which the fuel tank and spare wheel are located under the floor of the luggage boot, the tank being nearer the center of the vehicle than the spare wheel. The tank has a bottom wall which is downwardly inclined toward the center of the vehicle whereby, upon impact on the vehicle, the spare wheel slides under the tank along the inclined bottom wall.

4 Claims, 3 Drawing Figures

PATENTED FEB 15 1972    3,642,296

ARRANGEMENT OF A FUEL TANK AND A SPARE WHEEL ON AN AUTOMOBILE VEHICLES

The present invention relates to an automobile vehicle whose fuel tank and spare wheel are placed under the floor of the luggage boot.

It is current practice to dispose the fuel tank and the spare wheel under the floor of the luggage boot, which corresponds to optimum utilization of the available space and to easy access at all times to the spare wheel.

Further, to limit the effects of a serious accident on the occupants, present day vehicles are designed to permit a maximum absorption of the kinetic energy produced upon impact. This is achieved by the crushing of the front and rear end parts of the vehicle so as to preserve the center part, namely the compartment containing the passengers. Thus, in a serious accident, the tank could be subjected to the effects of the impact or shock directly, if it is too near to the end of the vehicle, or via the spare wheel if the latter is roughly in the same horizontal plane as the tank. There is consequently a serious risk of the tank being deformed and breaking open and resulting in the splashing of petrol. This is particularly dangerous since it increases the risk of fire.

The object of the present invention is to avoid this drawback.

The invention provides a vehicle having a fuel tank and a spare wheel disposed under the floor of the luggage boot, the tank occupying a position as near as possible to the center of the vehicle in the longitudinal direction, wherein the bottom of the tank is downwardly inclined in the direction of the center of the vehicle in at least a part of the width of the tank corresponding to the diameter of the spare wheel.

In this way, in the event of impact or shock on the vehicle in a direction roughly parallel to the longitudinal axis of the vehicle, the spare wheel disposed closer to the end of the vehicle than the tank withdraws along the inclined plane which constitutes the bottom wall of the tank and the danger of damage to the latter is considerably lessened.

According to another feature of the invention, the tank partly overlaps the spare wheel the latter being disposed in such manner that its mean plane is inclined in the same direction as the bottom of the tank.

Further features and advantages of the invention will be apparent from the ensuing description with reference to the accompanying drawings.

Figure 1:
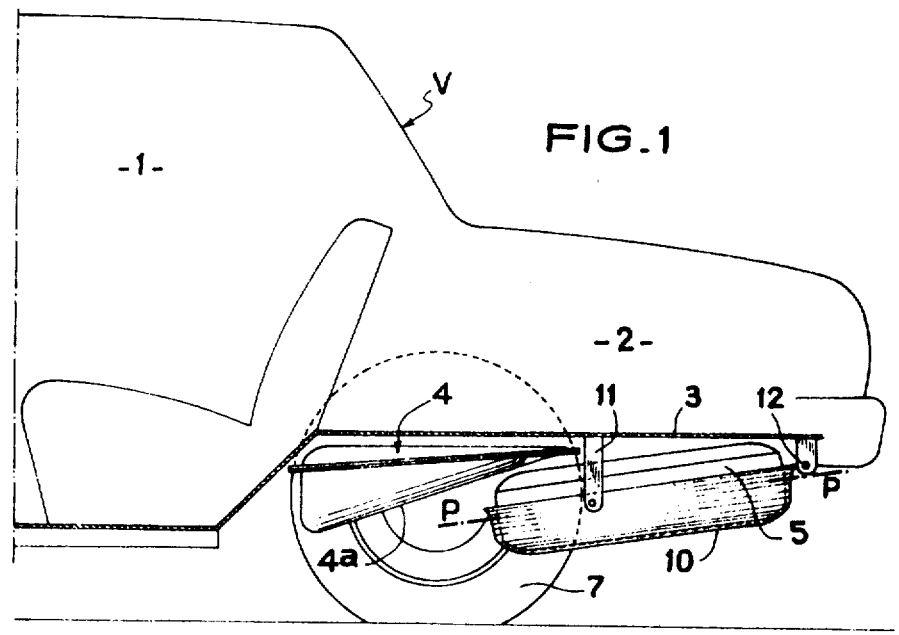
FIG. 1 is a diagrammatic longitudinal sectional view of the rear part of a vehicle according to the invention.
Figure 2:
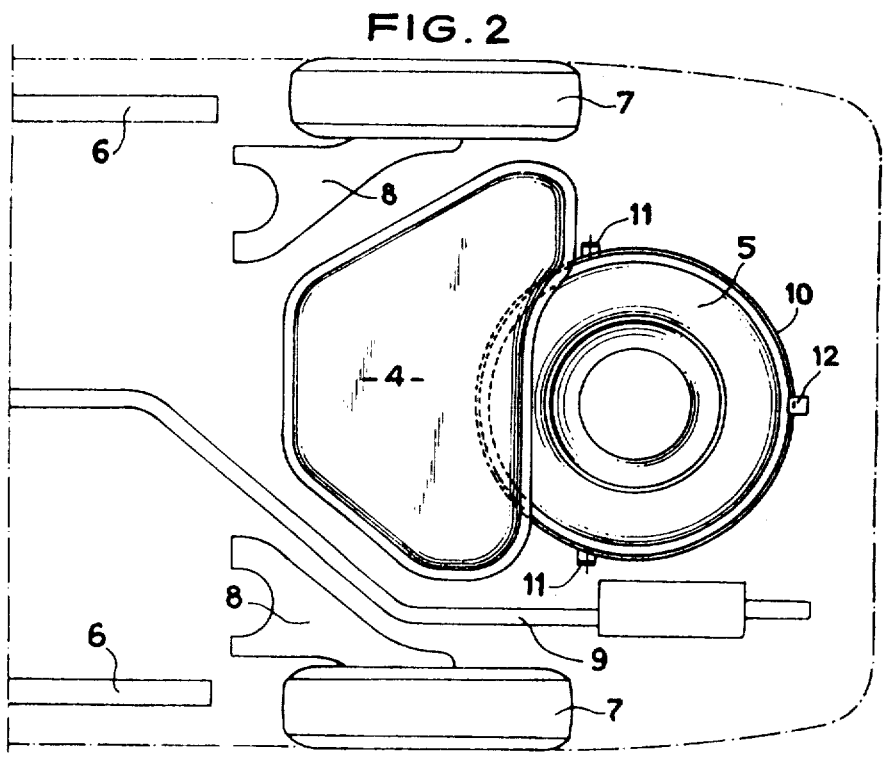
FIG. 2 is a diagrammatic plan view of the rear part of the vehicle.

FIGS. 1 and 2 show in particular the rear part of a vehicle having a front engine and front wheel drive and a rear luggage boot. The vehicle comprises a passenger and drive compartment 1 and a luggage boot 2 having a floor 3 under which are disposed a fuel tank 4 and a spare wheel 5. It can be seen from FIG. 2 that in the presently described embodiment the vehicle has two side frames 6 and independent wheels 7 mounted on suspension arms 8 pivoted to the body of the vehicle. Also shown in FIG. 2 is the exhaust pipe 9. The tank 4 is positioned as far as possible toward the front end of the vehicle between the rear wheels 7 and preferably in such manner as not to project rearwardly of the latter. Its shape in plan is such that it occupies the available space between a wheel and its suspension arm, on one hand, and the exhaust pipe, on the other. Further, it has a bottom wall 4a which is downwardly and forwardly inclined.

The spare wheel 5 is located in a container 10 of known design, suspended from and pivoted to front supports 11 and hooked at the rear by a conventional locking device 12 which can be opened, for example, from inside the luggage boot 2 or inside the compartment 1. The support elements 11 or their points of attachment to the vehicle or container are designed to collapse under the action of a considerable force, such as that undergone by the vehicle in the event of a violent shock or impact thereon. The wheel 5 has a mean plane P which is inclined in the same direction as the bottom wall 4a of the tank and is disposed partly under the latter.

Figure 3:
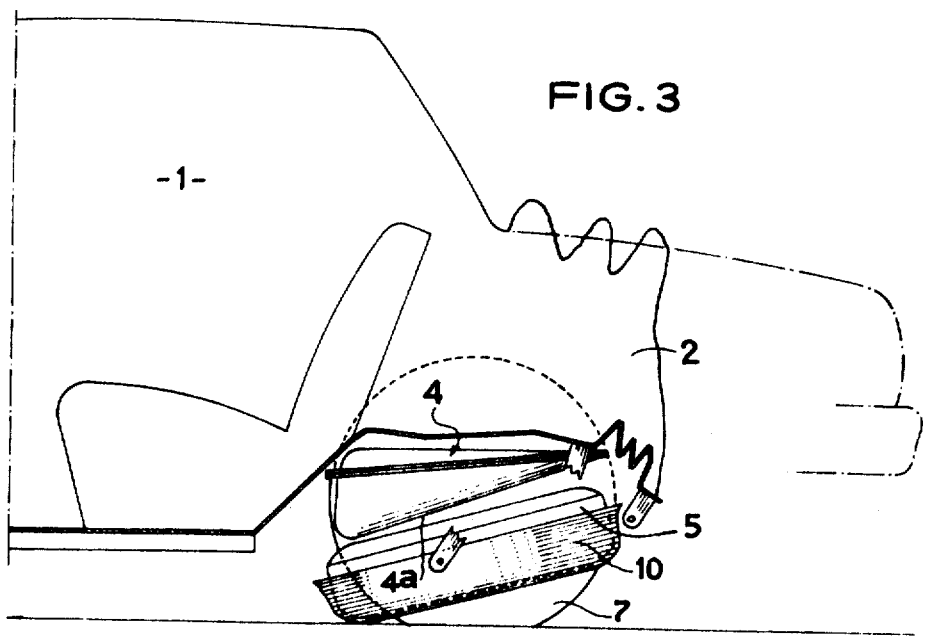
FIG. 3 is similar to FIG. 2 and shows the rear part of the vehicle after it has been crushed subsequent to impact.

In the event of a considerable shock from behind the sheet metal wall defining the luggage boot is crushed and absorbs a large amount of the kinetic energy created. Experience shows that this crushing is usually limited to the region of the rear wheels 7 owing to the strength of their connection to the chassis (FIG. 3). Further, even if the wheel suspensions are deformed, the movement of the wheels in the forward direction is limited by the fact that they come in contact with the side frames 6 of the lower part of the body.

It can be seen that as the fuel tank is placed between the wheels 7 without extending beyond the rear of the latter, there is relatively little likelyhood of its being crushed, even under the effect of a violent shock, provided that it is not subjected to the thrust of the spare wheel. This is ensured by the arrangement according to the invention. When the rear part of the vehicle is crushed or buckled, the front supports 11 break and the container 10 carrying the spare wheel is thrown forwardly and slides under the bottom wall 4a of the tank without crushing the latter.

This arrangement therefore substantially improves the safety for the passengers of the vehicle in the event of an impact on the rear part of the vehicle.

Note that the inclined part of the bottom wall of the tank could be restricted in width to a dimension corresponding to the diameter of the spare wheel so as to increase the capacity of the tank.

Further, in the case of a vehicle having a rear engine and drive and a front luggage boot, the tank and the spare wheel can be placed in the front. The inclination of the bottom wall of the tank is the reverse of that described in the foregoing embodiment, that is, downwardly and rearwardly inclined, and the spare wheel is disposed in front of the tank so as to be easily accessible.

Having now described my invention what I claim and desire to secure by Letters Patent is:

1. A vehicle having a center and comprising a luggage boot having a floor, a fuel tank and a spare wheel located under said floor, the tank being located nearer said center than the spare wheel longitudinally of the vehicle, the tank having a bottom wall which is downwardly inclined toward said center in at least a part of the width of the bottom wall corresponding to the outside diameter of the spare wheel.

2. A vehicle as claimed in claim 1, wherein the tank overlaps the spare wheel, the spare wheel being disposed in such manner that its mean plane is inclined in the same direction as said bottom wall of the tank.

3. A vehicle as claimed in claim 1, further comprising a container containing the spare wheel, and support means connecting the container to the vehicle and adapted to collapse under the effect of a violent force.

4. A vehicle as claimed in claim 1 and having a front engine, front driving wheels, rear wheels, and an exhaust pipe extending alongside one side of the vehicle, the tank being located in a free space between the exhaust pipe and a rear vehicle wheel disposed on a side of the vehicle opposed to said one side and a suspension arm for said rear wheel, the tank rearwardly extending no further than the rear of said rear wheels.

* * * * *